United States Patent
Forman et al.

(10) Patent No.: US 6,178,449 B1
(45) Date of Patent: Jan. 23, 2001

(54) APPARATUS AND METHOD FOR MEASURING TRANSACTION TIME IN A COMPUTER SYSTEM

(75) Inventors: Ron Frank Forman, Byron; John M. Pechacek, Rochester; Walter H. Schwane, Kasson, all of MN (US)

(73) Assignee: International Business Machines Corporation, Armonk, NY (US)

( * ) Notice: Under 35 U.S.C. 154(b), the term of this patent shall be extended for 0 days.

(21) Appl. No.: 08/979,224

(22) Filed: Nov. 26, 1997

(51) Int. Cl.[7] .......................... G06F 15/173; G06F 15/16
(52) U.S. Cl. ........................ 709/224; 709/202; 709/203; 709/223
(58) Field of Search .................. 709/224, 202, 709/219, 222, 223, 203

(56) References Cited

U.S. PATENT DOCUMENTS

| | | | |
|---|---|---|---|
| 5,655,081 | * 8/1997 | Bonnell et al. | 709/223 |
| 5,678,006 | * 10/1997 | Valizadeh et al. | 709/223 |
| 5,764,912 | * 6/1998 | Rosborough | 709/224 |
| 5,778,178 | * 7/1998 | Arunachalam | 709/203 |
| 5,787,253 | * 7/1998 | McCreery et al. | 709/231 |
| 5,796,633 | * 8/1998 | Burgess et al. | 709/224 |
| 5,937,165 | * 8/1999 | Schwaller et al. | 709/224 |
| 5,949,974 | * 9/1999 | Ewing et al. | 709/202 |

* cited by examiner

*Primary Examiner*—Zarni Maung
*Assistant Examiner*—Quoc-Khanh Le
(74) *Attorney, Agent, or Firm*—Martin & Associates, L.L.C; Derek P. Martin

(57) ABSTRACT

A transaction time measurement mechanism has a transaction time manager running on a server computer system, a transaction time agent running on a client computer system that is coupled to the server computer system via a network, and a simple protocol for allowing them to directly and efficiently communicate. The transaction time agent is configured according to configuration data stored in a configuration table in a transaction time database, and stores transaction time data in a statistics table according to this configuration. The data in the statistics table is indexed to allow retrieving only the transaction time data of interest. The simple communication protocol supports multiple transaction time managers in a network computing environment that may all communicate with a single client.

19 Claims, 6 Drawing Sheets

Config Table 482

| Appl-class-id .server-id | t1 | t2 | t3 | t4 | t5 | t6 | Time Out | Elapsed Notif. Thresh. | Min. Notif. Thresh. | Max Number Trans | Notification Address List |
|---|---|---|---|---|---|---|---|---|---|---|---|
| class 8.S-appl 1 | 1 | 5 | 10 | 20 | 0 | 0 | 60 | 20 | 120 | 255 | Server System 3 |
| class 9.* | .5 | 1 | 2 | 4 | 8 | 16 | 30 | 0 | 0 | 0 | null |
| | | | | | | | | | | | |

FIG. 5

Stats Table 484

| INDEX (server-id .appl-class-id .appl-instance-id) | Total Transaction Time | C1 | C2 | C3 | C4 | C5 | C6 | C7 | Time Outs | Elapsed Time Value List |
|---|---|---|---|---|---|---|---|---|---|---|
| S-appl1.class 8 .C-appl1 | | | | | | | | | | |
| S-appl3.class 9 .C-appl3 | | | | | | | | | | |
| | | | | | | | | | | |

FIG. 6

APPARATUS AND METHOD FOR MEASURING TRANSACTION TIME IN A COMPUTER SYSTEM

BACKGROUND OF THE INVENTION

1. Technical Field

This invention generally relates to computer systems, and more specifically relates to an apparatus and method for measuring transaction time in a computer system.

2. Background Art

The development of the EDVAC computer system of 1948 is often cited as the beginning of the computer era. Since that time, computer systems have evolved into extremely sophisticated devices, and computer systems may be found in many different environments. Since the dawn of the computer age, the performance of computers has been measured to determine how well the computer performs certain tasks. One measure of computer performance is response time, which is used herein to broadly define the time it takes the computer to perform a specific task or transaction. Generally, the response time that is of most interest is the user-perceived response time. For a single user on a single stand-alone computer system, the user-perceived response time is virtually the same as the time it takes the computer to perform the desired task or transaction. However, as multiple users and computers are added, the user-perceived response time is different than the processing time for the task on a single computer.

In the early days of computers, one or more relatively powerful and expensive computers could be shared by many users. Referring to FIG. 1, a number of computer terminals 130 were typically connected to a single computer 110 known as a "host." These computer terminals 130 are commonly known as non-programmable workstations (i.e., "dumb terminals") because they simply display information transmitted to it by the host, and lack any processing power to perform local tasks. One example of a very well-known computer terminal is the IBM 5250, which displays alpha-numeric text in row and column format. In a computing environment 100 with a host 110 and one or more terminals 130 (referred to herein as a host computing environment), a communications controller 120 was typically included to facilitate the communications between the single host 110 and multiple terminals 130. In a host computing environment 100, software applications run on host 110, and display information is transmitted by host 110 via communications controller 120 to terminals 130. In this manner a user sitting at a particular terminal 130 may start an application on host 110, and host 110 will then display an appropriate screen to the user at the appropriate terminal 130. The user may then enter data in response to the displayed screen, if required.

A host computer and its dumb terminals communicate using an architected data stream that determines the action to be taken when certain characters are transmitted back and forth. When the user desires to perform a task or transaction, the user inputs the appropriate information on the screen to start the task, and presses the enter key to send this information to the host in a data stream. The host takes the information, processes the information appropriately, returns data to the dumb terminal in a data stream (that is typically displayed on the screen), and then unlocks the keyboard for further input by the user.

Determining the user-perceived response time in a host computing environment is relatively straightforward by monitoring the data stream between the host and the terminals. The communications controller 120 monitors the data stream to determine when and how to pass the data between host 110 and terminals 130. As a result, integrating a response time measurement mechanism 160 into communications controller 120 is relatively straightforward. Response time measurement mechanism 160 includes a response time collector 140 and a response time list 150. A response time collector 140 determines the user-perceived response time, and stores this information in a response time list 150. The response time collector 140 starts a timer when the user presses the "Enter" key on his or her terminal, and stops the timer when host 110 sends the "keyboard unlock" message back to that terminal. Response time collector 140 then stores the response time in response time list 150. The contents of response time list 150 may be accessed by host 110 as needed. Response time monitoring mechanism 160 thus provides a simple way to accurately determine the user-perceived response time in a host computing environment 100. However, determining the user-perceived response time in a network computer environment presents greater challenges.

The widespread proliferation of computers prompted the development of computer networks that allow computers to communicate with each other. With the introduction of the personal computer (PC), computing became accessible to large numbers of people. Networks for personal computers were developed that allow individual users to communicate with each other. In this manner, a large number of people within a company, for example, could communicate at the same time with a software application running on one computer system. A computing system that includes multiple computers communicating over a network is generically referred to herein as a network computing environment. One example of a suitable network computing environment 200 is shown in FIG. 2, and includes a server computer system 210 communicating over a network with multiple clients 230.

Today, computer networks are ubiquitous, and great time and effort is being expended to increase the performance of computer networks. One aspect of performance is the user-perceived response time. However, with computers in a network computing environment, known network protocols do not provide any uniform mechanism for determining user-perceived response time. So important are user-perceived response times that some consultants are now basing their fees on the improvement in user-perceived response times they are able to achieve. Therefore, measurement of user-perceived response time is critically important. The problem of accurately measuring user-perceived response time in a network computing environment is complicated by the fact that multiple computers on the network may process sub-parts of a task or transaction in parallel, so the different computers that perform the various sub-tasks will not know when the entire task or transaction is complete. The focus of response time measurements in a network computing environment have been on measuring transaction times. Transaction time is the time required for a transaction to go from start to finish, regardless of how the various steps are accomplished. For the discussion herein, the term transaction time is understood to be the user-perceived response time.

One possible solution to monitoring user-perceived response time is illustrated in FIG. 2, and would place a response time measurement mechanism 260 in the server computer system 210. Response time measurement mechanism 260 could have a response time collector 240 and a response time list 250. Response time collector 240 would actively monitor and interrogate each client 230 to determine response times, and would store these response times in response time list 250. This solution, however, takes considerable processing power and excessive overhead, which would significantly degrade system performance. For this reason, this solution has not been implemented in large-scale networks.

The prior art methods of measuring response time in a network computing environment have excessive overhead, and are not easily implemented. Therefore, there existed a need to provide a response time monitoring mechanism that efficiently collects response times in a network computing environment without introducing excessive overhead.

DISCLOSURE OF INVENTION

According to preferred embodiments of the present invention, a transaction time measurement mechanism has a transaction time manager running on a server computer system, a transaction time agent running on a client computer system that is coupled to the server computer system via a network, and a simple protocol for allowing them to directly and efficiently communicate. The transaction time agent is configured according to configuration data stored in a configuration table in a transaction time database, and stores transaction time data in a statistics table according to this configuration. The data in the statistics table is indexed to allow retrieving only the transaction time data of interest. The simple communication protocol supports multiple transaction time managers in a network computing environment that may all communicate with a single client.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 5 is a block diagram of the configuration table shown in FIG. 4;

FIG. 6 is a block diagram of the statistics table shown in FIG. 4; and

BEST MODE FOR CARRYING OUT THE INVENTION

The transaction time monitoring mechanisms of the present invention will be discussed in terms of object oriented software. For those that are not familiar with object oriented software, the Overview section below presents background material for understanding the preferred embodiments described below.

Overview

Object Oriented Programming

One of the relatively recent advances in the field of software development has been the emergence of object oriented programming technology. The goal of using object-oriented programming is to create small, reusable sections of program code known as objects that can be quickly and easily combined and re-used to create new programs. This is similar to the idea of using the same set of building blocks again and again to create many different structures. The modular and re-usable aspects of objects typically speeds development of new programs, thereby reducing the costs associated with the development cycle. In addition, by creating and re-using a group of well-tested objects, a more stable, uniform, and consistent approach to developing new computer programs can be achieved.

One of the central ideas in object oriented programming is the concept of a class. A class is a definition of a set of like objects. As such, a class can be thought of as an abstraction of the objects or as a definition of a type of object. From the view of a computer system, a single object represents an encapsulated set of data and the operation or a group of operations that are performed by a computer system upon that data.

Each class definition comprises data definitions that define the information controlled by the object and operation definitions that define the operation or operations performed by objects on the data that each object controls. In other words, a class definition defines how an object acts and reacts to other objects by defining an operation or set of operations that is/are performed on the defined data. (Please note that operations are sometimes called methods, method programs, and/or member functions.) Objects interact by invoking their own methods or by invoking methods on other objects. When taken together, the defined methods and data are said to be the behavior of the object. In essence, then, a class definition defines the behavior of its member object or objects. Objects are instantiated as members of a class, and are often referred to as instances.

Description of the Preferred Embodiments

According to preferred embodiments disclosed herein, user-perceived response times are monitored by determining the time it takes for a transaction to complete. A transaction time measuring mechanism is provided that allows transaction time data to be efficiently collected over a standard interface in a manner that provides minimal network overhead, and that allows for multiple transaction time managers on multiple server systems in a network computing environment.

Figure 1:
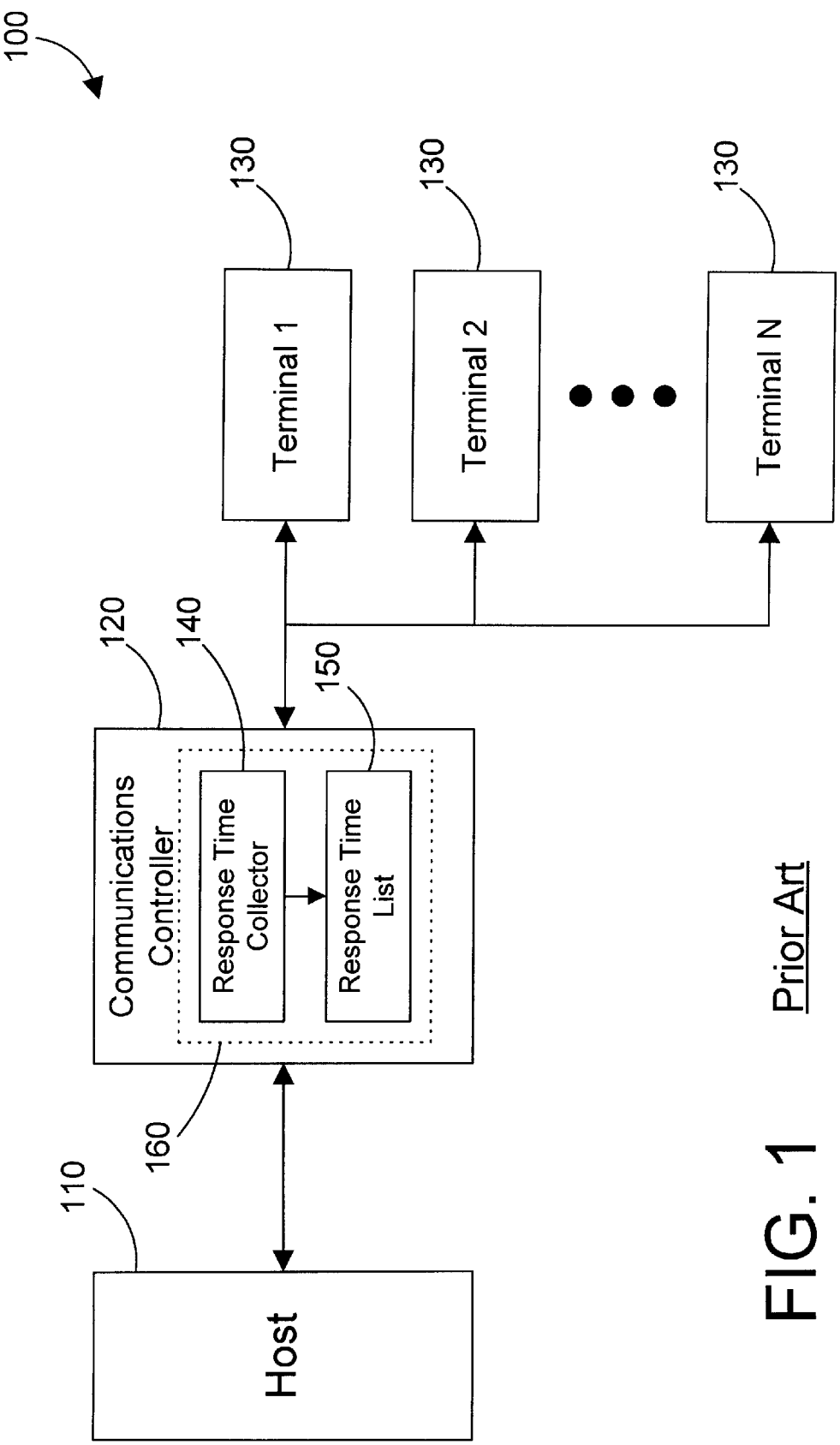
FIG. 1 is a block diagram of a computer system showing response time measurement in a host computing environment.
Figure 2:
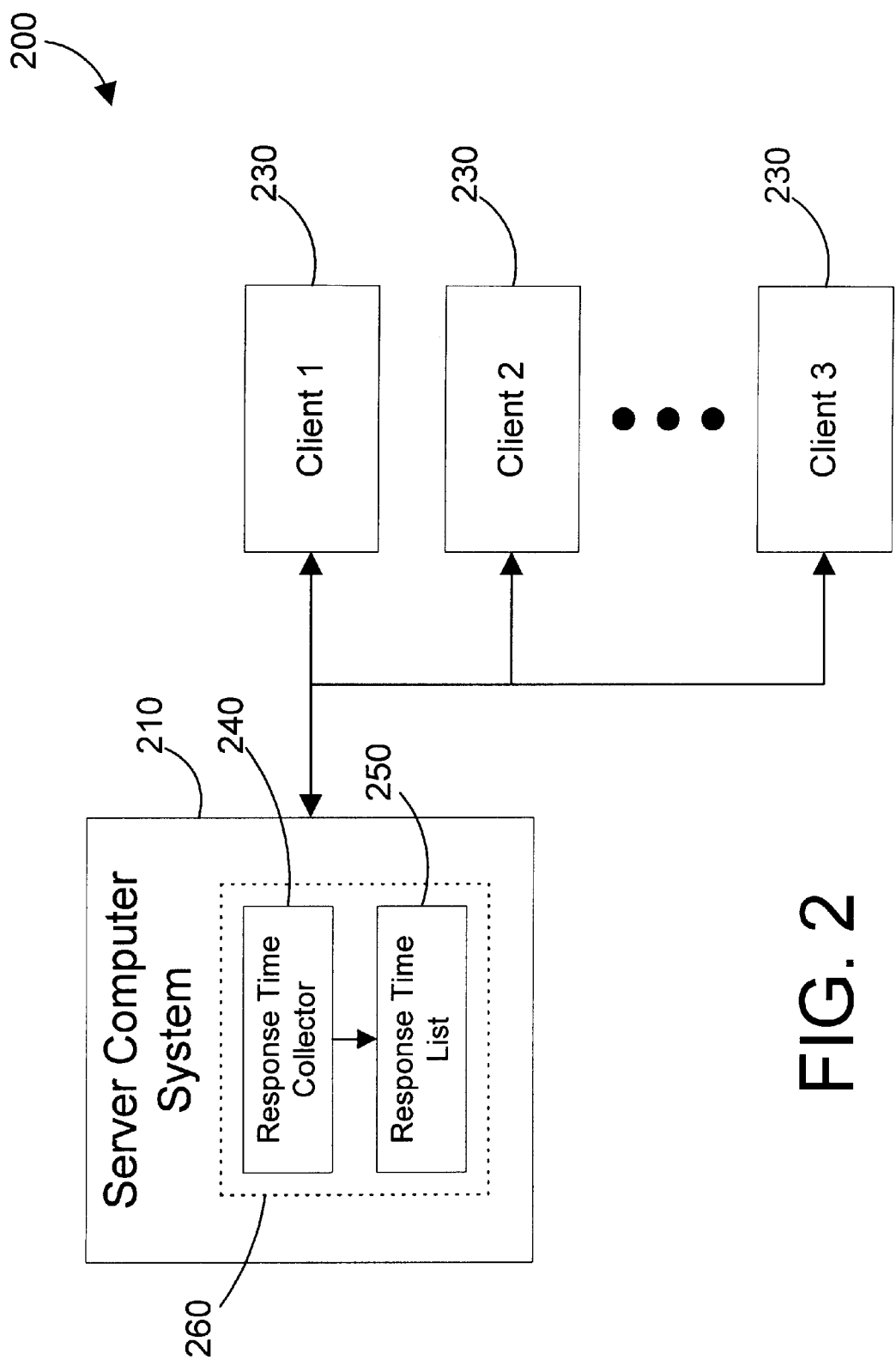
FIG. 2 is a block diagram of a computer system showing one possible method for collecting response time measurements in a network computing environment.
Figure 3:
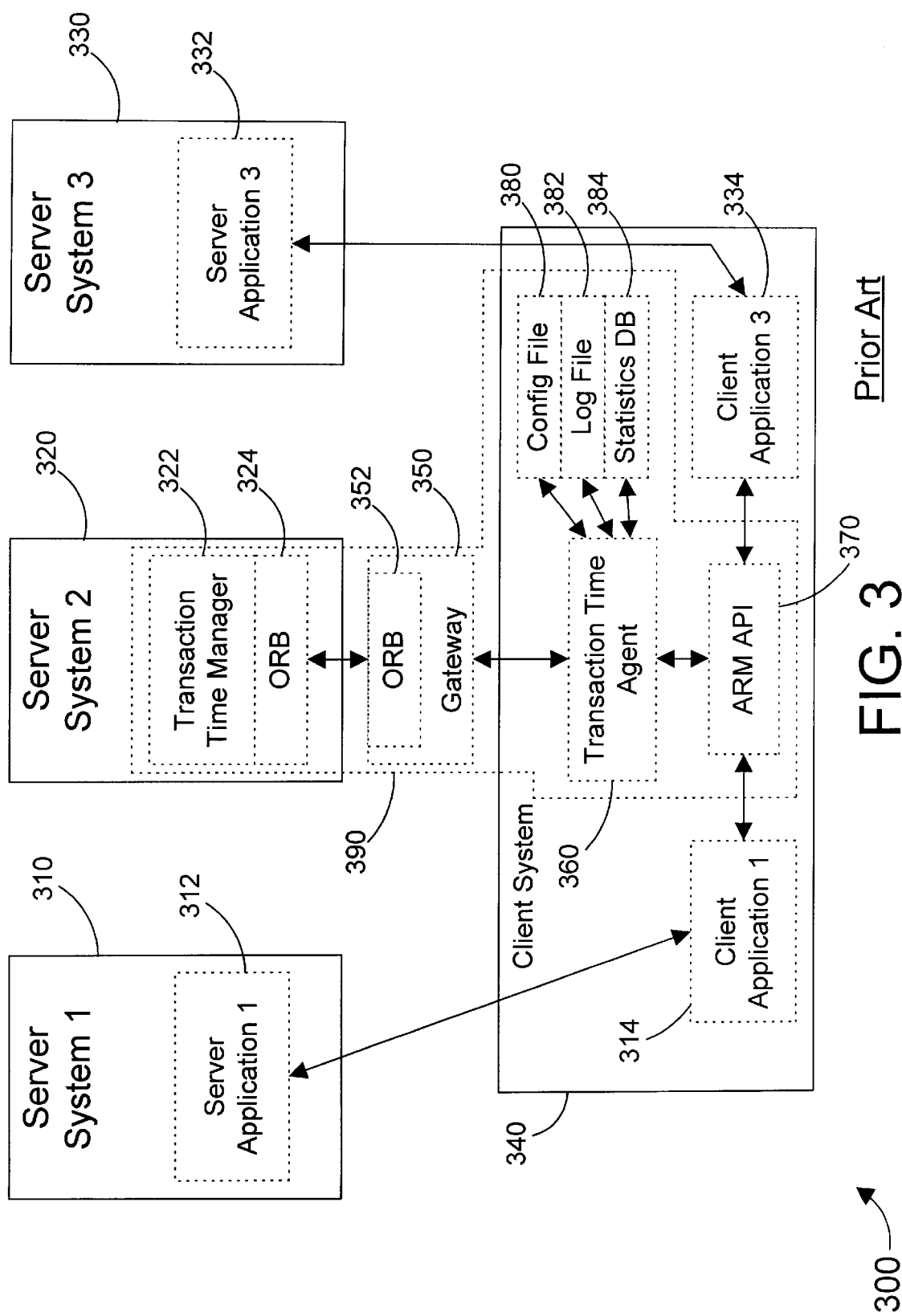
FIG. 3 is a block diagram a computer system showing a possible method for collecting transaction time measurements in a network computing environment.

One possible solution to monitoring user-perceived response time is presented herein with reference to the specific network computing environment 300 of FIG. 3, which is representative of a system developed by Tivoli Systems Inc. of Austin, Tex. Network computing environment 300 includes a first server 310, a second server 320, a third server 330, and a client 340. While network computing environment 300 is illustrated in FIG. 3 with a single client for simplicity of illustration, the actual configuration will include multiple clients, as is common on most computer networks. We assume for the purposes of illustrating this possible solution that: server system 1 (310) includes a server application 1 (312); server system 2 (320) includes a transaction time manager 322 and an Object Request Broker (ORB) 324; and server system 3 (330) includes a server application 3 (332). Server applications 1 (312) and 3 (332) represent portions of applications 1 and 3 that run on a server. Note that there are corresponding pieces of these applications running on client 340, discussed below. Transaction time manager 322 and ORB 324 are portions of a transaction time measurement mechanism 390, discussed in more detail below.

Client system 340 includes a client application 1 (314), a client application 3 (334), a transaction time agent 360, an application response measurement (ARM) application program interface (API) 370, a configuration file 380, a log file 382, and a statistics database 384. Client applications 1 (314) and 3 (334) represent the portions of applications 1 and 3 that run on client 340. Client application 1 (314) communicates with server application 1 (312) via a standard network protocol, such as hypertext transfer protocol (http), TCP/IP, or IBM 5250 protocol. Client application 3 (334) also communicates with server application 3 (332) via a standard network protocol. The components of client 340 other than client application 1 (314) and 3 (334) shown in FIG. 3 are part of transaction time measurement mechanism 390.

Transaction time measurement mechanism 390 includes transaction time manager 322 and ORB 324 in server system 2 (320); gateway 350 with its ORB 352; and transaction time agent 360, ARM API 370, config file 380, log file 382, and statistics database 384 on client 340. Transaction time manager 322 controls the operation of transaction time measurement mechanism 390. Transaction time agent 360 resides on client 340 and collects response times according to information in the config file 380. ARM API 370 is suitably a Tivoli-HP ARM or similar API that allows the agent to record transaction times by having the application call the API at both the beginning and the end of the transaction. Thus, ARM API 370 is called by client system 340 to start and stop transaction times in transaction time agent 360. Config file 380 defines one or more fields that determine the operation of transaction time agent 360, such as thresholds for response times, whether or not the response times are reported and to whom, etc. Log file 382 contains historical information relating to the transaction times collected by transaction time agent 360. Config file 380 and log file 382 are typically flat files, and data is written to and read from these files by programs on the local system or remote systems using standard file input/output operations and remote file transfer mechanisms. Thus, if historical response time data for a particular application (e.g., application 1) are desired from the log file 382, all of the data must be read and processed to determine which data correspond to application 1. Statistics database 384 contains a list of all response times collected by transaction time agent 360 for all applications on all servers.

Gateway 350 and ORBs 324 and 352 provide a mechanism for server system 2 (320) to communicate with client system 340. Gateway 350 is a piece of software that may reside on any server on the network. ORB 324 and ORB 352 intercommunicate in accordance with well-known and defined standards discussed below.

The Object Management Group (OMG) is a standards group formed by a large alliance of software companies to help standardize object software. The goal of the group is to provide specifications that form a common framework for object-based application development. This reduces the complexity and lowers the cost of introducing new or enhanced object-based software applications. The Common Object Request Broker Architecture (CORBA) is an OMG specification designed to provide a framework for the sharing of objects across a wide variety of hardware platforms and operating systems. CORBA allows applications to communicate with one another regardless of location or vendor. In particular, CORBA defines inter-operability by specifying the design and interaction behavior of Object Request Brokers (ORBs) such that ORBs from different vendors can effectively communicate and inter-operate with each other. This has been accomplished by defining the application interface protocol in a language-independent specification. Detailed information on the OMG and the CORBA specification is available on the World Wide Web at http://www.omg.org.

Another important application program that is used in a typical object-oriented environment is known as the Object Request Broker (ORB). The ORB establishes client-server relationships between various objects. ORBs are a well known technology that allows an application on one machine to invoke methods on objects that reside on another machine. ORBs provide the infrastructure that allows objects to converse with each other, independent of the specific platforms and techniques used to implement the various objects. Using an ORB, a client object can transparently invoke a method on a server object, whether the server object is located on the same machine or on a different machine connected via a network. The ORB operates by intercepting method calls and finding an object that can implement the request, passing the request parameters to the object, invoking the method, and returning the results. While doing so, the client need not be aware of where the object is located, the programming language of the object, the operating system of the object, or any other system-related aspects. Thus, the ORB provides inter-operability between applications on different machines in heterogeneous distributed environments and seamlessly interconnects multiple object systems.

Thus, an ORB on one computer system is used to communicate with an ORB on another computer system. For the networked computer system of FIG. 3, ORB 324 communicates with ORB 352 in gateway 350. The protocol for communicating between ORBs results in a heavy interface, one that requires significant overhead. Gateway 350 receives data from ORB 352, and communicates this data to client 340 via a light interface, such as a peer-to-peer network connection.

Imposing the requirements of ORBs on the interface between portions of response time collection mechanism 390 results in unneeded complexity and overhead in collecting response times. In addition, network computing environment 300 of FIG. 3 only has a single transaction time manager 322 on one server, and has no provision for multiple transaction time managers in multiple servers. These limitations are overcome by a network computing environment in accordance with the preferred embodiment.

Figure 4:
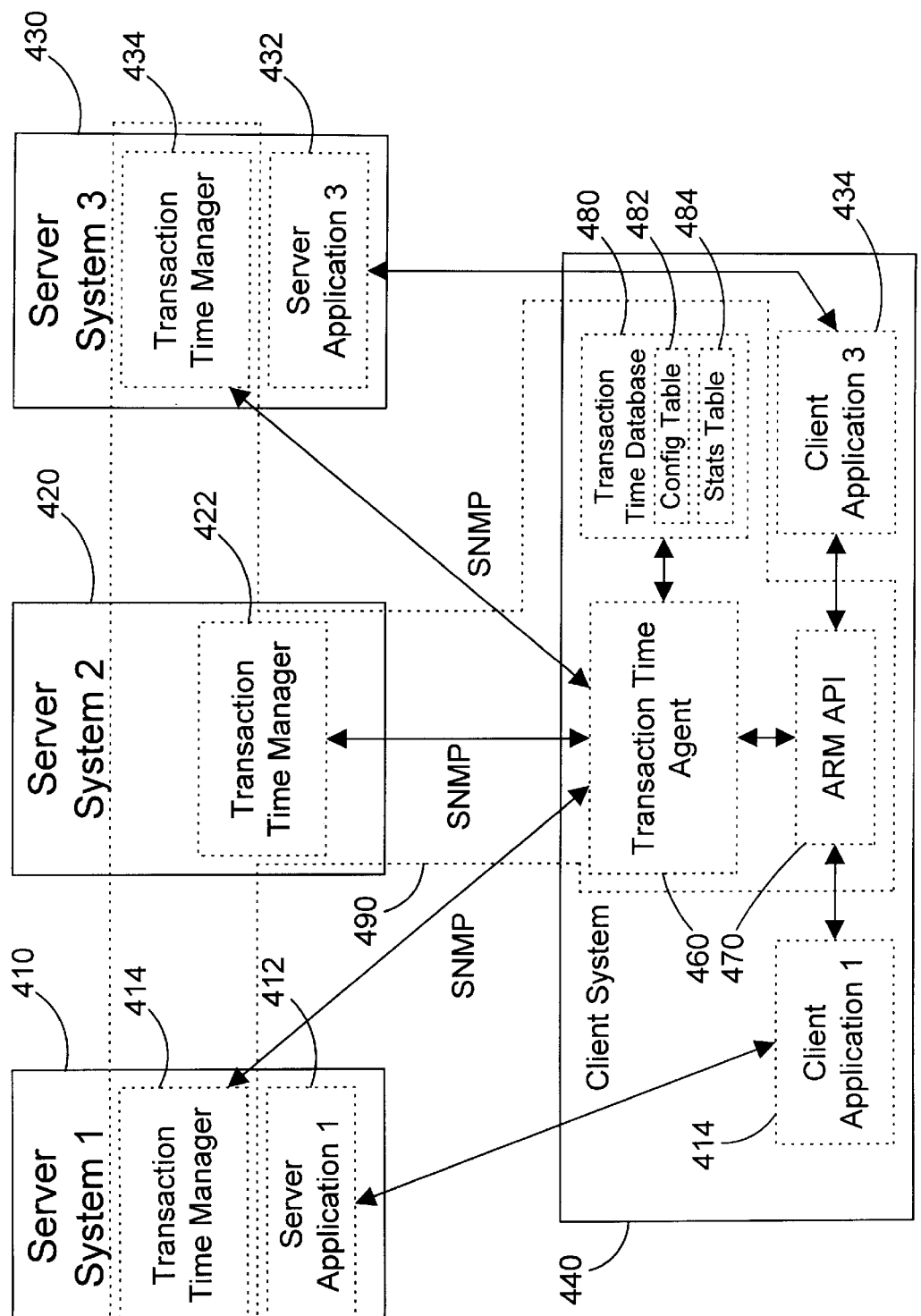
FIG. 4 is a block diagram of a computer system for collecting transaction time measurements in a network computing environment according to a preferred embodiment of the present invention.

Referring to FIG. 4, a suitable network computing environment 400 in accordance with the preferred embodiment overcomes the limitations of network computing environment 300 of FIG. 3 by including a transaction time measurement mechanism 490 that communicates between client and server over a simple, light, standard interface, such as SNMP. Network computing environment 400 includes: a server system 1 (410), a server system 2 (420), a server system 3 (430), and a client system 440 interconnected via a network. As with network computing environment 300 of FIG. 3, network computing environment 400 is understood to include multiple clients. For the purposes of the preferred embodiment herein, the present invention applies equally no matter how the different computer systems in network computing environment 400 are interconnected, regardless of whether the connections are is made using present-day analog and/or digital techniques or via some networking mechanism of the future. Server system 1 includes a server application 1 (412), and also includes a transaction time manager 414. Server system 2 (420) includes a transaction time manager 422. Server system 3 (430) includes a server application 3 (432) and further includes a transaction time manager 434. For the purposes herein, a "server system" is used in its broadest sense to mean any system that may interact with client system 440.

Client system 440 includes a client application 1 (414), a client application 3 (434), a transaction time agent 460, an ARM API 470, and a transaction time database 480. Similar to network computing environment 300 in FIG. 3, transaction time agent 460 communicates with client applications 1 (414) and 3 (434) via ARM API 470. However, instead of communicating with a gateway 350 that includes an ORB 352, transaction time agent 460 communicates directly with transaction time managers 414, 422, and 434 via SNMP interfaces. SNMP is a standard that is presented in Request for Comment (RFC) 1157, and was developed by the Internet Engineering Task Force (IETF). Details regarding the SNMP standard may be found at www.internic.net. The SNMP protocol is a light protocol that does not require significant network overhead, unlike the protocol for communicating between ORBs.

A significant advantage of network computing environment 400 of the preferred embodiment over known systems and the network computing environment 300 (FIG. 3) is that network computing environment 400 allows a single transaction time agent 460 to communicate with multiple transaction time managers 414, 422, and 434. Another significant advantage is that the communication between transaction time agent 460 and transaction time managers 414, 422, and 434 does not require the heavy interface that ORBs require, but uses instead a standard, light SNMP protocol. In addition, transaction time database 480 provides an indexed database that may be queried rather than flat files. As a result, portions of config table 482 and stats table 484 may be written to or read from without writing/reading the entire file, as was the case for network computing environment 300. Transaction time database 480 therefore allows for efficient retrieval of only certain transaction time data. For example, if server system 1 (410) is only interested in the transaction times for client application 1, transaction time agent 460 may efficiently retrieve only the requested information from stats table 484.

At this point, it is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media such as floppy disks and CD ROMs, and transmission type media such as digital and analog communication links.

Referring now to FIG. 5, a specific configuration for config table 482 in accordance with the preferred embodiment provides a method for determining how transaction time agent 460 will collect transaction times. The first column is an identifier field that uniquely identifies an application. The specific format shown in FIG. 5 uses an application class identifier, followed by a period, then followed with the appropriate server identifier. The application class identifier is a unique class identifier for a particular class of applications in network computing environment 400. The server identifier identifies the server and application of interest. The combination of the two thus provide a unique identifier for each application that may run in network computing environment 400.

The next six fields are threshold fields that contain six threshold values t1–t6. For the discussion herein, we assume the numbers in FIG. 5 are in milliseconds (ms). Each threshold value must be equal to or larger than the previous threshold value. For class 8.S-appl 1 (the first row in table 482), threshold 1 is thus set to 1 ms; threshold 2 to 5 ms; threshold 3 to 10 ms; threshold 4 to 20 ms; and thresholds 5 and 6 to 0 ms. For the threshold values in config table 482, a zero represents infinity. Thus, setting thresholds 5 and 6 to zero results in threshold 4 being the last defined threshold. The next field is a Time Out field that defines a maximum value that a transaction should never exceed. For the first row of config table 482, this value is set to 60 ms. The next column is for an elapsed notification threshold, which determines a time value that, when exceeded, will cause a system to be notified. For the first row of config table 482, this value is set to 20 ms, which means that if the transaction time exceeds 20 ms, a system specified in the notification address list (in the last column of table 482) will be notified. For the first row of table 482, this is set to 20 ms, and the notification address list specifies server system 3, so server system 3 will be notified if the transaction time ever exceeds 20 ms for the application identified in the first column. The next field is for a minimum notification threshold value. This value is set to assure that a timeout is not repeatedly reported to the system in the notification address list. For the first row of config table 482, this value is set to 120 ms, meaning that if a notification has occurred within the last 120 ms, we won't notify again. This inhibits needlessly repetitive notification of which the system in the notification address list is already aware. Note that the second row of config table 482 of FIG. 5 has different thresholds set for t1–t6, has a different time out value (30 ms), and has zeroes for the elapsed notification threshold, the minimum notification threshold, the maximum number of transactions, and has a null in the notification address list. This means that no system will be notified in the event of any abnormal occurrence, but the transaction time data will be available in the stats table 484 if and when a transaction time manager (such as 414, 422, or 434) desire to access this data.

With the config table 482 of FIG. 5 properly configured, transaction time agent 460 is now ready to collect transaction times for the listed applications. Referring to the first column of stats table 484 in FIG. 6, each entry in stats table 484 is identified by an index that includes the server identifier, application class identifier, and instance identifier. The server identifier is an identifier that corresponds to a unique server process in the network, such as a uniform resource locator (URL) or an IP address and socket number. The application class identifier is one of a discrete list of values associated with the client application and maintained in a globally accessible registry in the network or configured manually for each application by the administrator. The application instance identifier uniquely identifies one of the application instances (i.e., client applications) in the network. A wildcard value "*" (meaning "any") may be used in the index for the server identifier or the application class identifier or both. An index value of "*.*" thus designates the global threshold configuration, defining thresholds which apply to all application class and server tuples, unless overridden by a more specific threshold configuration table entry. The index allows efficient retrieval of only requested data from stats table 484. The next column stores a total time for all transactions stored in stats table 484 for the application instance specified in the first column. The next seven columns contain count values that correspond to the six thresholds set in config table 482. Count 1 (C1) is incremented if the transaction time is below threshold t1 in config table 482. C2 is incremented if the transaction time is between t1 and t2. C3 is incremented if the transaction time is between t2 and t3. C4 is incremented if the transaction time is between t3 and t4. C5 is incremented if the transaction time is between t4 and t5. C6 is incremented if the transaction time is between t5 and t6. And C7 is incremented if the transaction time is over t6. The next field is a counter that keeps track of the number of time outs that occur. Thus, for the first row of stats table 484 (which corresponds to the first row of config table 482 of FIG. 5), each time the transaction time exceeds 60 ms the time outs counter of stats table 484 is incremented. The last column in stats table 484 is an elapsed time value list that provides that actual elapsed times for each transaction in a list. The counters provide data that has a level of granularity defined by the thresholds set in config table 482. In many cases, the counters provide all the data that is needed in monitoring transaction times. However, in some circumstances, more detailed information may be needed than is available from the counters. For example, if the counters reveal certain information, the exact transaction times may be determined from the elapsed time value list. The transaction times are in a simple list format, so determining the data of interest would generally require some post-processing, but these times are made available in the case they are needed.

The programmability of the transaction time agent 460 through the structure and content of the config file 482 allows great flexibility in reporting measured response times. The transaction time agent 460 may be configured by a transaction time manager so the transaction time manager must collect data periodically, or it may be configured to send notifications to a transaction time manager at a specified interval only if a specific threshold is exceeded. The thresholds are suitably selected so that transaction time data is only transmitted on an exception basis, thereby minimizing network overhead.

Figure 7:
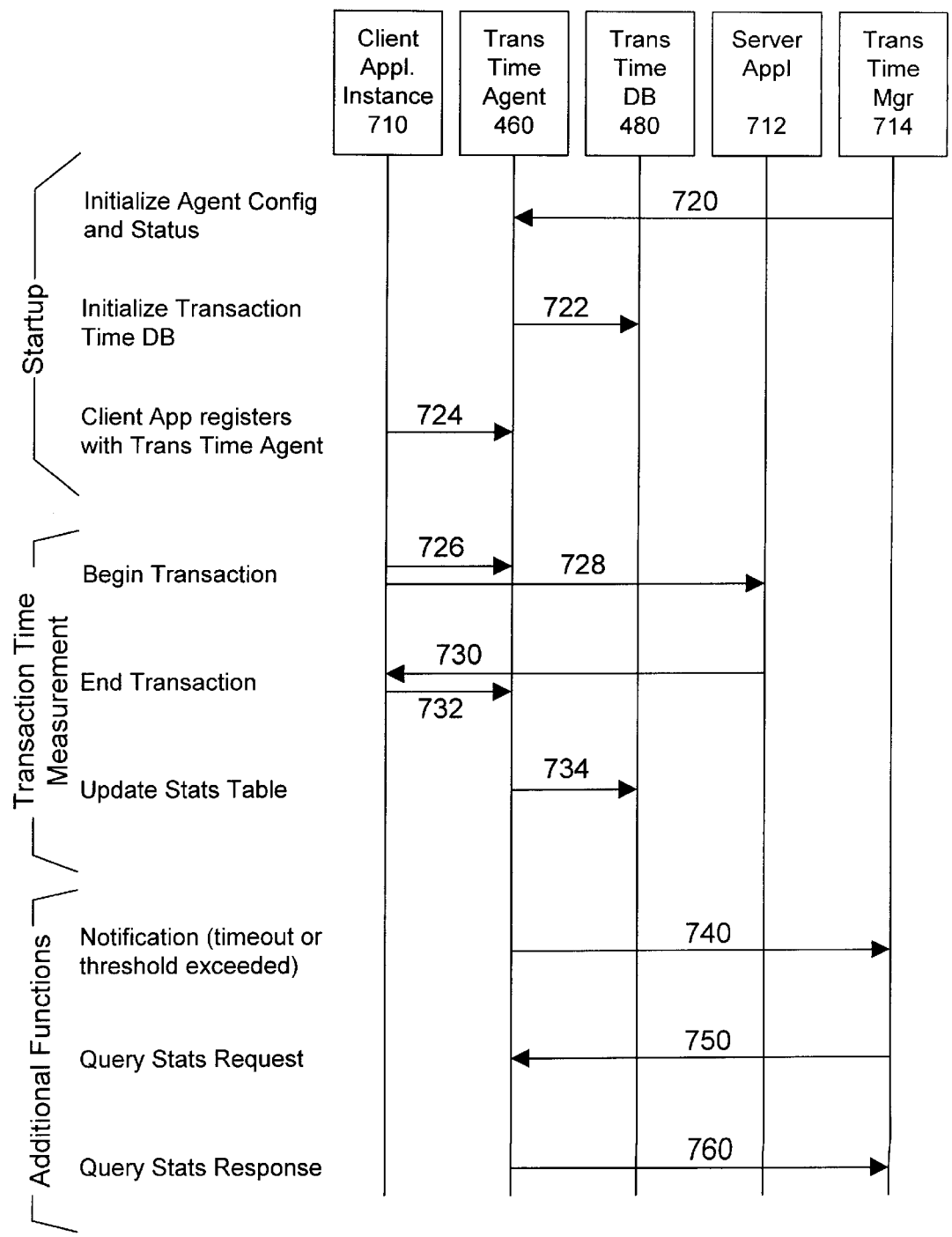
FIG. 7 is a flow diagram of steps that may be performed in measuring transaction times according to a method in accordance with a preferred embodiment.

The method of monitoring transaction times using the computer system of FIGS. 4–6 is represented in a flow diagram of FIG. 7. The various components are shown along the top of the diagram, with the arrows below indicating which components perform the listed function on another component. The client application instance 710 corresponds to one of the client applications, such as client application 1 (414) or 3 (434) of FIG. 4. Transaction time agent 460 and transaction time database 480 are the same as shown in FIG. 4. Server application 712 corresponds to a server application running on a server computer system, such as server application 1 (412) or 3 (432). Transaction time manager 714 corresponds to a transaction time manager, such as transaction time managers 414, 422, or 434.

The first step is for the transaction time manager 714 to initialize the transaction time agent 460 (step 720). This initialization includes writing configuration data to a configuration table, such as config table 482 of FIG. 5. Once the transaction time agent 460 is initialized, the transaction time agent 460 initializes the transaction time database 480 (step 722) This initialization involves defining the appropriate fields and counters to correspond to the configuration of the transaction time agent 460. For example, the configuration table 482 of FIG. 5 has six thresholds. This mandates that stats table 484 have seven counters. If only four thresholds were configured in config table 482, only five counters would be required in stats table 484. Thus, after the agent is initialized in step 720, the agent initializes the database to correspond to the configuration and status (step 722).

The next step is that a client application instance 710 must register with the transaction time agent 460 (step 724). Monitoring all client instances is unnecessary and would result in excessive overhead. By requiring a client application instance 710 to register with the transaction time agent 460, only those client instances that request transaction time monitoring will be monitored. Steps 720–724 are performed during the startup phase of the transaction monitoring, which may be suitably performed when network computing environment 400 is powered-up and/or initialized.

The actual measurement and recording of transaction times occurs in steps 726–734. When a transaction is started, the client application instance 710 notifies the transaction time agent 460 in step 726 of the beginning of a transaction. The notification in step 726 for network computing environment 400 of FIG. 4 is performed by a client application (such as 414 or 434) calling ARM API 470. Client application instance 710 then performs the required interactions with the corresponding server application 712 in step 728. When the transaction is complete, server application 712 notifies the client application instance 710 in step 730, and client instance 710 then notifies transaction time agent 460 of the end of the transaction in step 732. Again, for network computing environment 400, step 732 is performed by calling ARM API 470. The transaction time agent then updates the stats table in transaction time database 480 (step 734) to reflect the newly-acquired transaction time. This process repeats for each transaction that occurs for each client application that has registered with the transaction time agent 460.

Once the transaction time measuring infrastructure is in place in a network computing environment as described herein, other functions may also be performed. For example, with a transaction time measurement mechanism 490 configured according to the first row in table 482 of FIG. 5, server system 3 will be notified if the elapsed notification threshold is exceeded. This notification is represented as step 740 of FIG. 7. In addition, at any time a transaction time manager 714 may request to query a transaction time agent 460 for the statistics regarding transaction times (step 750). In response to this query, transaction time agent 460 may respond by sending the requested data from stats table 484 to the requesting transaction time manager 714 (step 760).

The present invention thus succeeds at providing a transaction time measurement mechanism that has one or more transaction time managers running on server computer systems, a transaction time agent running on a client computer system that is coupled to the server computer system via a network, and a simple protocol for allowing them to directly and efficiently communicate. The simple communication protocol supports multiple transaction time managers in a network computing environment that may all communicate with a single client. Using a system in accordance with the present invention, transaction times may be accurately monitored without the network overhead associated with prior art solutions.

While the invention has been particularly shown and described with reference to preferred embodiments thereof, it will be understood by those skilled in the art that various changes in form and details may be made therein without departing from the spirit and scope of the invention. For example, it will be understood that, while various of the conductors (connections) are shown in the drawing as single lines, they are not so shown in a limiting sense, and may comprise plural conductor (connections), as is understood in the art.

What is claimed is:

1. An apparatus comprising:
   (A) at least one server computer system running at least one server application;
   (B) at least one client computer system running at least one client application that corresponds to the at least one server application, the at least one client computer system being coupled to the at least one server computer system via a networking mechanism; and
   (C) a transaction time measurement mechanism comprising:
      (C1) at least one transaction time manager residing on and executed by the at least one server computer system;
      (C2) at least one transaction time agent residing on and executed by the at least one client computer system, the transaction time agent receiving notification of the beginning of a transaction from the at least one client application and receiving notification of the end of a transaction from the at least one client application;
   (D) an interface coupling the at least one transaction time manager to the at least one transaction time agent that supports a simple protocol that allows the transaction time manager to directly communicate with the transaction time agent; and
   (E) a transaction time database coupled to the at least one transaction time agent, the transaction time database comprising:
      (E1) at least one configuration table for storing at least one transaction time configuration, the configuration table defining a plurality of time thresholds; and
      (E2) at least one statistics table for storing transaction times according to the at least one transaction time configuration stored in the at least one configuration table, wherein the at least one statistics table defines at least one counter, each counter corresponding to a time interval defined by two of the plurality of time thresholds.

2. The apparatus of claim 1 wherein the protocol comprises a simple network management protocol (SNMP).

3. The apparatus of claim 1 further comprising an application response monitoring (ARM) application programming interface (API) that is called by the at least one client application to indicate to the at least one transaction time agent the start and the end of a transaction.

4. The apparatus of claim 1 wherein the at least one transaction time manager comprises a plurality of transaction time managers running on different server computer systems.

5. An apparatus comprising:
   (A) a plurality of server computer systems running at least one server application;
   (B) a client computer system running at least one client application that corresponds to the at least one server application, the client computer system being coupled to the at least one server computer system via a networking mechanism;
   (C) a transaction time measurement mechanism comprising:
      (1) a plurality of transaction time managers residing on and executed by the plurality of server computer systems;
      (2) a transaction time agent residing on and executed by the client computer system, the transaction time agent receiving notification of the beginning of a transaction from the at least one client application and receiving notification of the end of a transaction from the at least one client application; and
      (3) an interface coupling the plurality of transaction time managers to the transaction time agent, the interface supporting a simple network management protocol (SNMP);
   (D) an application response monitoring (ARM) application programming interface (API) that is called by the at least one client application to indicate to the transaction time agent the start and the end of a transaction; and
   (E) a transaction time database comprising:
      (1) a configuration table defining a plurality of time thresholds; and
      (2) a statistics table for storing transaction times according to the configuration stored in the configuration table, the statistics table defining at least one counter, each counter corresponding to a time interval defined by two of the plurality of time thresholds.

6. A method for measuring transaction times in a networked computer system including at least one client computer system coupled via a network to at least one server computer system, the method comprising the steps of:
   (A) executing a transaction time manager on the at least one server computer system;
   (B) executing a transaction time agent on the at least one client computer system;
   (C) the transaction time manager initializing the transaction time agent;
   (D) the transaction time agent initializing a transaction time database according to the initialization of the transaction time agent, the initialization of the transaction time database comprising the steps of:
      (D1) defining a plurality of time thresholds; and
      (D2) defining at least one counter, each counter corresponding to a time interval defined by two of the plurality of time thresholds;
   (E) at least one client application registering with the transaction time agent;
   (F) a registered client application notifying the transaction time agent of the beginning of a transaction;
   (G) incrementing each counter when a time period in the transaction lies between the two threshold values that correspond to the counter;
   (H) a server application corresponding to the registered client application notifying the registered client application of the end of the transaction;
   (I) the registered client application notifying the transaction time agent of the end of the transaction; and
   (J) the transaction time agent measuring the time from the beginning of the transaction to the end of the transaction, and updating the transaction time database with the time measurement.

7. The method of claim 6 wherein steps (F) and (H) are performed by the registered client application calling an application response monitoring (ARM) application programming interface (API).

8. The method of claim 6 further comprising the step of the transaction time agent notifying the transaction time manager when the time measurement exceeds a predetermined threshold.

9. The method of claim 6 further comprising the step of the transaction time manager requesting statistics stored in the transaction time database from the transaction time agent.

10. The method of claim 9 further comprising the step of the transaction time agent retrieving the requested statistics from the transaction time database and returning the requested statistics to the transaction time manager.

11. A program product comprising:
(A) a transaction time measurement mechanism comprising:
  (1) at least one transaction time manager;
  (2) at least one transaction time agent that communicates with the transaction time manager via a simple protocol that allows the transaction time manager to directly communicate with the transaction time agent, the transaction time agent receiving notification of the beginning of a transaction from a client application and receiving notification of the end of a transaction from the client application;
  (3) a transaction time database that communicates with the at least one transaction time agent, the transaction time database comprising:
    at least one configuration table for storing at least one transaction time configuration, the configuration table defining a plurality of time thresholds; and
    at least one statistics table for storing transaction times according to the at least one transaction time configuration stored in the at least one configuration table, wherein the at least one statistics table defines at least one counter, each counter corresponding to a time interval defined by two of the plurality of time thresholds; and
(B) signal bearing media bearing the transaction time measurement mechanism.

12. The program product of claim 11 wherein the signal bearing media comprises recordable media.

13. The program product of claim 11 wherein the signal bearing media comprises transmission media.

14. The program product of claim 11 wherein the protocol comprises a simple network management protocol (SNMP).

15. The program product of claim 11 wherein the transaction time measurement mechanism further comprises an application response monitoring (ARM) application programming interface (API)) that is called to indicate the start and the end of a transaction.

16. The program product of claim 11 wherein the at least one transaction time manager comprises a plurality of transaction time managers running on different server computer systems.

17. A program product comprising:
(A) a transaction time measurement mechanism comprising:
  (1) at least one transaction time manager;
  (2) a transaction time agent that communicates with the transaction time manager via a simple protocol that allows the transaction time manager to directly communicate with the transaction time agent;
  (3) an application response monitoring (ARM) application programming interface (API) that is called by a client application to indicate to the transaction time agent the start and the end of a transaction;
  (4) at least one configuration table for storing a plurality of transaction measurement configurations, each transaction measurement configuration defining a plurality of time thresholds;
  (5) at least one statistics table for storing transaction times according to at least one of the plurality of transaction measurement configurations stored in the at least one configuration table, the at least one statistics table defining at least one counter, each counter corresponding to a time interval defined by two of the plurality of time thresholds; and
(B) signal bearing media bearing the transaction time measurement mechanism.

18. The program product of claim 17 wherein the signal bearing media comprises recordable media.

19. The program product of claim 17 wherein the signal bearing media comprises transmission media.

* * * * *